US008892803B2

(12) United States Patent
Lee

(10) Patent No.: US 8,892,803 B2
(45) Date of Patent: Nov. 18, 2014

(54) INTERRUPT ON/OFF MANAGEMENT APPARATUS AND METHOD FOR MULTI-CORE PROCESSOR

(75) Inventor: Ju-Pyung Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1102 days.

(21) Appl. No.: 12/880,335

(22) Filed: Sep. 13, 2010

(65) Prior Publication Data

US 2011/0072180 A1 Mar. 24, 2011

(30) Foreign Application Priority Data

Sep. 23, 2009 (KR) ........................ 10-2009-0090288

(51) Int. Cl.
*G06F 13/24* (2006.01)

(52) U.S. Cl.
CPC ..................................... *G06F 13/24* (2013.01)
USPC ......................................................... 710/262

(58) Field of Classification Search
USPC .......... 710/260, 262, 266, 269; 718/100, 102, 718/103, 108
See application file for complete search history.

(56) References Cited

U.S. PATENT DOCUMENTS

| 5,321,825 | A | * | 6/1994 | Song | 711/163 |
| 5,515,538 | A | * | 5/1996 | Kleiman | 710/260 |
| 5,995,745 | A | * | 11/1999 | Yodaiken | 703/26 |
| 6,061,709 | A | * | 5/2000 | Bronte | 718/103 |
| 6,516,403 | B1 | * | 2/2003 | Koyanagi | 712/203 |
| 7,093,147 | B2 | * | 8/2006 | Farkas et al. | 713/320 |
| 7,350,006 | B2 | | 3/2008 | Yasue et al. | |
| 7,434,224 | B2 | * | 10/2008 | Lescouet et al. | 718/108 |
| 7,493,436 | B2 | | 2/2009 | Blackmore et al. | |
| 7,503,039 | B2 | * | 3/2009 | Inoue et al. | 717/154 |
| 7,543,306 | B2 | | 6/2009 | Gaur | |
| 7,716,407 | B2 | * | 5/2010 | Almasi et al. | 710/260 |
| 7,917,910 | B2 | * | 3/2011 | Cavallo | 718/108 |
| 7,996,595 | B2 | * | 8/2011 | Wolfe | 710/265 |
| 7,996,843 | B2 | * | 8/2011 | Van Der Veen | 718/104 |
| 2001/0054055 | A1 | * | 12/2001 | Bollella | 709/102 |
| 2004/0111593 | A1 | | 6/2004 | Arimilli et al. | |

(Continued)

FOREIGN PATENT DOCUMENTS

KR    10-2004-0049255    6/2004

OTHER PUBLICATIONS

Steve Brosky, "Shielded CPUs: Real-Time Performance in Standard Linux," *Linux Journal*, May 1, 2004, pp. 1-4.

(Continued)

*Primary Examiner* — Khanh Dang
(74) *Attorney, Agent, or Firm* — NSIP Law

(57) ABSTRACT

Provided are an interrupt on/off management apparatus and method for a multi-core processor having a plurality of central processing unit (CPU) cores. The interrupt on/off management apparatus manages the multi-core processor such that at least one of two or more CPU cores included in a target CPU set can execute an urgent interrupt. For example, the interrupt on/off management apparatus controls the movement of each CPU core from a critical section to a non-critical section such that at least one of the CPU cores is located in the non-critical section. The critical section may include an interrupt-disabled section or a kernel non-preemptible section, and the non-critical section may include an interrupt-enabled section or include both of the interrupt-enabled section and a kernel preemptible section.

19 Claims, 9 Drawing Sheets

(56) References Cited

U.S. PATENT DOCUMENTS

| | | |
|---|---|---|
| 2005/0015764 A1 | 1/2005 | Gaur |
| 2007/0130569 A1* | 6/2007 | Heffley et al. ............... 718/108 |
| 2007/0204268 A1* | 8/2007 | Drepper ...................... 718/102 |
| 2007/0226795 A1* | 9/2007 | Conti et al. ..................... 726/22 |
| 2008/0072009 A1* | 3/2008 | Kim ............................. 711/206 |
| 2008/0104296 A1 | 5/2008 | Blackmore et al. |
| 2008/0115138 A1 | 5/2008 | Nachimuthu et al. |
| 2008/0126652 A1 | 5/2008 | Vembu et al. |
| 2008/0155542 A1* | 6/2008 | Maigne et al. ............... 718/100 |
| 2009/0089470 A1 | 4/2009 | Ven |
| 2009/0248934 A1* | 10/2009 | Ge et al. ...................... 710/261 |
| 2010/0287556 A1* | 11/2010 | Munz ........................... 718/102 |
| 2011/0106995 A1* | 5/2011 | Gopalakrishnan et al. ... 710/269 |
| 2011/0271142 A1* | 11/2011 | Zimmer et al. ................. 714/10 |
| 2011/0302589 A1* | 12/2011 | Aussagues et al. ........... 718/104 |

OTHER PUBLICATIONS

Lee et al., "Delayed Locking Technique for Improving Real-Time Performance of Embedded Linux by Prediction of Timer Interrupt" In *Proceedings of the 11th IEEE Real Time on Embedded Technology and Applications Symposium*, 2005, IEEE Computer Society, pp. 1-10.

\* cited by examiner

FIG.11

| bitmap | CPU3 | CPU4 |
|---|---|---|
| 0000 | | |
| 0100 | About to enter | |
| | DI | |
| 0000 | exit | |
| 1000 | | About to enter |
| | | DI |
| | About to enter | |
| 0000 | | exit |
| 0100 | | |
| | DI | |
| 0000 | exit | |

INTERRUPT ON/OFF MANAGEMENT APPARATUS AND METHOD FOR MULTI-CORE PROCESSOR

CROSS REFERENCE TO RELATED APPLICATION

This application claims the benefit under 35 U.S.C. §119(a) of Korean Patent Application No. 10-2009-0090288, filed on Sep. 23, 2009, the entire disclosure of which is incorporated herein by reference for all purposes.

BACKGROUND

1. Field

The following description relates to interrupt handling, for example, interrupt handling in a multi-core processor.

2. Description of the Related Art

A critical section exclusively executed for synchronization may exist at multiple locations in an operating system. For example, the term 'exclusively' denotes that a central processing unit (CPU) executes a corresponding process regardless of other conditions. Therefore, when an interrupt signal is generated in the critical section, it is not processed or processing thereof is delayed; regardless of importance or urgency.

In an operating system of a computer, a critical section may be implemented as an interrupt-disabled section, a kernel non-preemptible section, or a combination of the two. The interrupt-disabled section is a section in which an interrupt is not processed since an interrupt handler is not executed. The kernel non-preemptible section is a section in which kernel preemption is not possible since a process switch or a context switch does not occur even if the interrupt handler is executed. In addition to the interrupt-disabled section and the kernel non-preemptible section, the time required to process an interrupt signal may also be considered as a critical section in a broad sense. This is because a CPU processing a specified interrupt may not process other interrupts until processing of the specified interrupt is finished.

A critical section, such as the interrupt-disabled section and/or the kernel non-preemptible section, prevents a problem with synchronization, which may result from interrupt handling, in an operating system. Therefore, the critical section exists in an operating system of a computer. However, the critical section causes delay in the execution of an urgent interrupt which wakes up a real-time process that should be processed quickly. Even in a multi-core system, delay in the processing of an urgent interrupt due to the critical section tends to be unavoidable. To prevent delay in the processing of an urgent interrupt, various techniques have been suggested, such as a lock breaking technique, a dual kernel technique, a shielded CPU technique, and a delayed locking technique.

SUMMARY

In one general aspect, there is provided a multi-core processor and a multi-core computing system including an interrupt on/off apparatus guaranteeing the processing of an urgent interrupt or reducing or minimizing a delay in the processing of the urgent interrupt. Accordingly, real-time performance of a general-use operating system that runs on a multi-core system may be improved and thus being suitable for use in, for example, a high-performance real-time operating system.

In another general aspect, there is provided an interrupt on/off management apparatus and method and a multi-core computing system including the interrupt on/off apparatus, the interrupt on/off apparatus and method enabling one or more urgent interrupts, which is/are to be processed quickly, to be processed within a minimum time delay without being affected by an interrupt-disabled section or a kernel non-preemptible section.

In another general aspect, there is provided an interrupt on/off management apparatus for a multi-core processor comprising n ($\geq 2$) central processing unit (CPU) cores, the apparatus including a determination unit configured to determine whether each of m ($2 \leq m \leq n$) CPU cores included in a target CPU set among the n CPU cores is located in a critical section or a non-critical section, and a control unit configured to control the m CPU cores such that one or more of the m CPU cores are located in the non-critical section, based on the determination result of the determination unit.

The control unit may control entry of a first CPU core, which is located in the non-critical section among the m CPU cores, into the critical section.

In response to the determination unit determining that all of (m−1) CPU cores excluding the first CPU core among the m CPU cores are located in the critical section, the control unit may prevent the first CPU core from entering the critical section.

The control unit may control entry of the first CPU core into the critical section in response to an execution time of the critical section being longer than a predetermined period of time.

The critical section may include an interrupt-disabled section, and the non-critical section may include an interrupt-enabled section.

The critical section may include any one of an interrupt-disabled section and a kernel non-preemptible section, and the non-critical section may include an interrupt-enabled section and a kernel preemptible section.

The determination unit may determine whether each of the m CPU cores included in the target CPU set is located in the critical section or the non-critical section based on interrupt on/off information indicating a section in which each of the m CPU cores included in the target CPU set is located.

The apparatus may further include a target designation unit configured to designate a type and/or number of CPU cores included in the target CPU set among the n CPU cores.

The apparatus may further include an interrupt delivery unit configured to deliver an urgent interrupt to any one of the CPU cores located in the non-critical section or broadcast the urgent interrupt to all of the m CPU cores included in the target CPU set, based on the determination result of the determination unit.

The urgent interrupt may include a local timer interrupt, and the interrupt delivery unit may deliver information so as to execute the local timer interrupt between the m CPU cores included in the target CPU set.

The interrupt delivery unit may deliver the urgent interrupt or controls an interrupt dispatcher, which is separate from the interrupt delivery unit, to deliver the urgent interrupt.

The m and n may be integers equal to or greater than three, and the control unit may control the m CPU cores such that at least two of the m CPU cores included in the target CPU set are located in the non-critical section.

In another general aspect, there is provided an interrupt on/off management method for a multi-core processor comprising n ($\geq 2$) CPU cores, the method including determining whether each of m ($2 \leq m \leq n$) CPU cores included in a target CPU set among the n CPU cores is located in a critical section or a non-critical section, and controlling the m CPU cores such that at least one of the m CPU cores is located in the non-critical section, based on the determination.

The critical section may include an interrupt-disabled section, and the non-critical section may include an interrupt-enabled section, and the controlling of the m CPU cores may include controlling a first CPU core, which is located in the interrupt-enabled section among the m CPU cores, to enter into the interrupt-disabled section.

The method may further include locking state information of the m CPU cores included in the target CPU set before the determining of whether each of the m (2≤m≤n) CPU cores included in the target CPU set among the n CPU cores is located in the critical section or the non-critical section, wherein in response to the determination that all of the (m−1) CPU cores are located in the interrupt-disabled section, the first CPU core may be prevented from entering the interrupt-disabled section during the controlling of the m CPU cores, and the determining of whether each of the m (2≤m≤n) CPU cores included in the target CPU set among the n CPU cores is located in the critical section or the non-critical section may be repeated.

The method may further include locking state information of the m CPU cores included in the target CPU set before the determining of whether each of the m (2≤m≤n) CPU cores included in the target CPU set among the n CPU cores is located in the critical section or the non-critical section, and unlocking the state information of the m CPU cores to allow the first CPU core to enter the interrupt-disabled section in response to the determination that at least one of the (m−1) CPU cores is located in the interrupt-enabled section.

The critical section may include any one of an interrupt-disabled section and a kernel non-preemptible section, and the non-critical section may include an interrupt-enabled section and a kernel preemptible section, and the controlling of the m CPU cores may include controlling a first CPU core, which is located in the non-critical section among the m CPU cores, to enter into the critical section.

The method may further include locking state information of the m CPU cores included in the target CPU set before the determining of whether each of the m (2≤m≤n) CPU cores included in the target CPU set among the n CPU cores is located in the critical section or the non-critical section, determining whether the first CPU core is located in the critical section or the non-critical section before the determining of whether each of the m (2≤m≤n) CPU cores included in the target CPU set among the n CPU cores is located in the critical section or the non-critical section, and unlocking the state information of the m CPU cores to allow the first CPU core to enter the interrupt-enabled section or the kernel preemptible section in response to the determination that the first CPU core is located in the critical section.

The method may further include, before the determining of whether each of the m (2≤m≤n) CPU cores included in the target CPU set among the n CPU cores is located in the critical section or the non-critical section, locking state information of the m CPU cores included in the target CPU set, and determining whether the first CPU core is located in the critical section or the non-critical section. Wherein the determining of whether each of the m (2≤m≤n) CPU cores included in the target CPU set among the n CPU cores is located in the critical section or the non-critical section may be performed in response to the determination that the first CPU core is located in the critical section, and in response to the determination that all of the (m−1) CPU cores are located in the critical section, the first CPU core may be prevented from entering the interrupt-disabled section or the kernel non-preemptible section, and the determining of whether each of the m (2≤m≤n) CPU cores included in the target CPU set among the n CPU cores is located in the critical section or the non-critical section may be repeated.

The method may further include locking state information of the m CPU cores included in the target CPU set, determining whether the first CPU core is located in the critical section or the non-critical section, wherein the determining of whether each of the m (2≤m≤n) CPU cores included in the target CPU set among the n CPU cores is located in the critical section or the non-critical section may include determining whether each of the m (2≤m≤n) CPU cores included in the target CPU set among the n CPU cores is located in the critical section or the non-critical section in response to the determination that the first CPU core is located in the critical section, and unlocking the state information of the m CPU cores to allow the first CPU core to enter the interrupt-disabled section or the kernel non-preemptible section in response to the determination that at least one of the (m−1) CPU cores is located in the non-critical section.

Other features and aspects will be apparent from the following detailed description, the drawings, and the claims.

BRIEF DESCRIPTION OF THE DRAWINGS

FIG. 11 is a diagram illustrating an example of an interrupt on/off management method for a multi-core processor, based on the flowchart of FIG. 7.

Figure 1A:
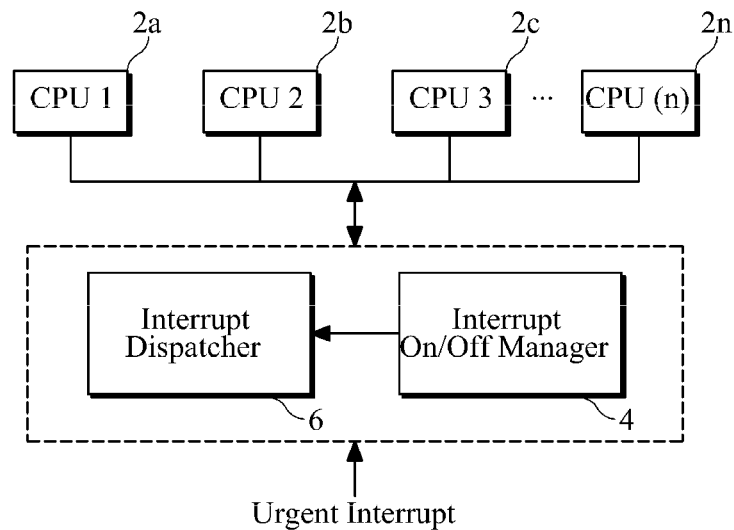
FIG. 1A is a block diagram illustrating an example of a multi-core computing system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1B:
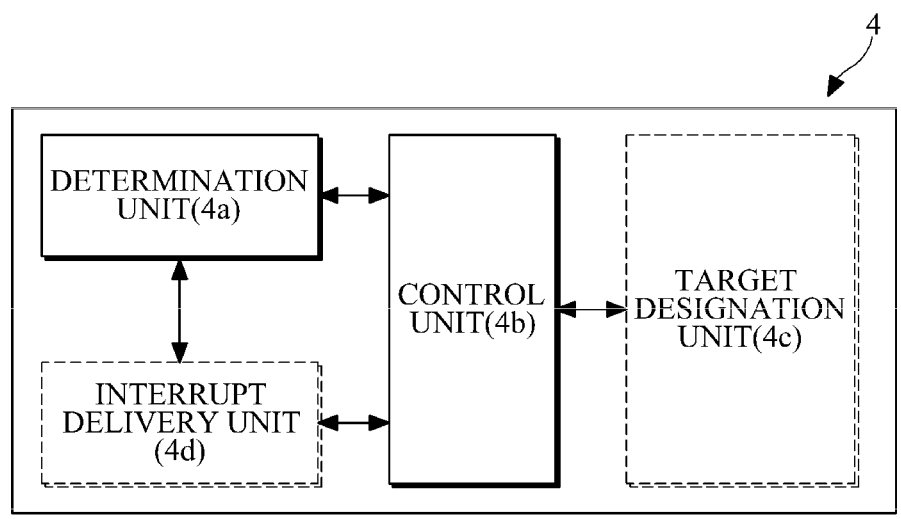
FIG. 1B is a block diagram illustrating an interrupt on/off manager shown in FIG. 1A.

FIG. 1A shows an example of a multi-core computing system. FIG. 1B shows an example of an interrupt on/off manager 4 shown in FIG. 1A. The interrupt on/off manager 4 may also be referred to as the interrupt on/off management apparatus.

Referring to FIG. 1A, the multi-core computing system includes n (≥2) central processing unit (CPU) cores 2a through 2n and the interrupt on/off manager 4 of the n CPU cores 2a through 2n. Referring to FIG. 1B, the interrupt on/off manager 4 includes a determination unit 4a, a control unit 4b, a target designation unit 4c, and an interrupt delivery unit 4d. The target designation unit 4c and the interrupt delivery unit 4d may be optional components.

The multi-core computing system includes two or more CPU cores 2a through 2n. All of the n CPU cores 2a through 2n may run on a single operating system. That is, the multi-core computing system may not necessarily be a system in which a plurality of operating system kernels run together. The multi-core computing system may be a general system in which a single operating system kernel runs. In addition, a real-time process or an important interrupt may not necessarily be executed by a specified CPU core but may be executed by one or more other CPU cores (for example, all CPU cores included in 'target CPU set' which will be described later). Hereinafter, an interrupt, which wakes up a real-time process that is given priority over other processes currently being executed by the multi-core computing system, may be referred to as an 'urgent interrupt.'

Figure 2A:
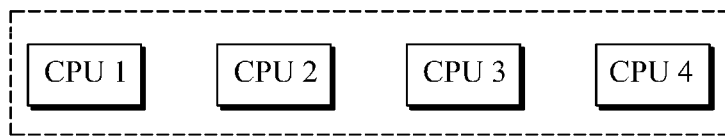
FIGS. 2A and 2B are diagrams illustrating examples of target central processing unit (CPU) sets formed in a multi-core computing system including four CPU cores.
Figure 2B:
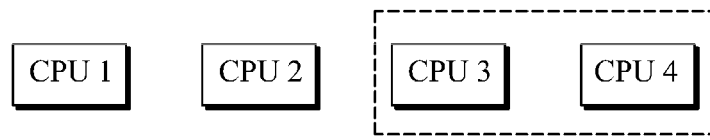

Of the n CPU cores 2a through 2n, m (2≤m≤n) CPU cores are included in a target CPU set. A 'target CPU set' refers to a group of CPU cores whose movement from a non-critical section to a critical section is controlled by the interrupt on/off manager 4, for example, the control unit 4b of the interrupt on/off manager 4. The target CPU set may include all or part of the n CPU cores 2a through 2n, but at least two CPU cores. FIGS. 2A and 2B show examples of target CPU sets that can be formed in a multi-core computing system including four (n=4) CPU cores. A target CPU set provided in FIG. 2A includes all of the four CPU cores (m=4), and a target CPU set provided in FIG. 2B includes two of the four CPU cores (m=2).

The number and/or type of CPU cores included in a target CPU set may be predetermined in the multi-core computing system or may be determined by the interrupt on/off manager 4. In the latter case, the interrupt on/off manager 4, for example, the control unit 4b or the target designation unit 4c may determine the number and/or type of CPU cores, which are included in a target CPU set, the determination being performed arbitrarily or based on external inputs. The number and/or type of CPU cores included in a target CPU set may vary. Also, the control unit 4b or the target designation unit 4c of the interrupt on/off manager 4 may adjust the number and/or type of CPU cores included in a target CPU set in response to a request (for example, a request for joining to a target CPU set or a request for leaving the target CPU set) from each CPU core.

Each of m CPU cores included in a target CPU set may repeatedly enter or leave the critical section (an interrupt-disabled section 'DI' and/or a kernel non-preemptible section 'NP'). In this case, the control unit 4b of the interrupt on/off manager 4 controls the m CPU cores such that at least one of the m CPU cores is located in the non-critical section and that the other CPU cores are located in the critical section. Whether a CPU core is located in the critical section or the non-critical section may be determined by whether the CPU core is located in the interrupt-disabled section 'DI' or an interrupt-enabled section 'EN'. In this case, when a CPU core is located in the interrupt-disabled section 'DI', it may be determined to be in the critical section. When the CPU core is located in the interrupt-enabled section 'EN', it may be determined to be in the non-critical section.

In addition to whether a CPU core is located in the interrupt-disabled section 'DI' or the interrupt-enabled section 'EN', whether the CPU core is located in the kernel non-preemptible section 'NP' or a kernel preemptible section 'P' may be taken into consideration in determining whether the CPU core is located in the critical section or the non-critical section. In this case, when a CPU core is located in the interrupt-disabled section 'DI' or the kernel non-preemptible section 'NP', it may be determined to be in the critical section. When the CPU core is located in the interrupt-enabled section 'EN' and the kernel preemptible section 'P', it may be determined to be in the non-critical section.

Figure 3:
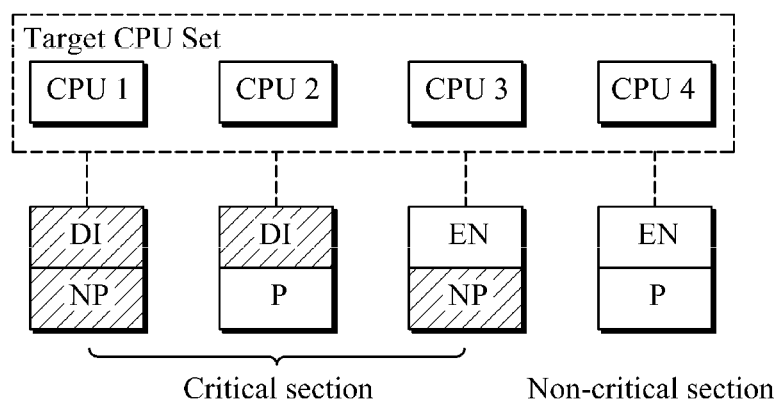
FIG. 3 is a block diagram illustrating an example of a target CPU set that includes four CPU cores, each being located in a critical section or a non-critical section.

FIG. 3 shows an example of a target CPU set that includes first through fourth CPU cores, CPU1 through CPU4, each being located in the critical section or the non-critical section. To determine whether each of the first through fourth CPU cores, CPU1 through CPU4, in FIG. 3 is located in the critical section or the non-critical section, whether each of the first through fourth CPU cores, CPU1 through CPU4, is located in the kernel preemptible section 'P' or the kernel non-preemptible section 'NP' has been taken into consideration, in addition to whether each of the first through fourth CPU cores, CPU1 through CPU4, is located in the interrupt-enabled section 'EN' or the interrupt-disabled section 'DI'. Referring to FIG. 3, the first through third CPU cores, CPU1 through CPU3, are located in the critical section since they are located in the interrupt-disabled section 'DI' or the kernel non-preemptible section 'NP'. In contrast, the fourth CPU core CPU4 is located in the non-critical section since it is located in both of the interrupt-enabled section 'EN' and the kernel preemptible section 'P'.

Figure 4:
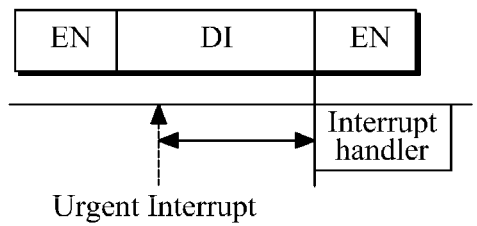
FIG. 4 is a diagram for explaining a case where an urgent interrupt is delivered to a CPU core located in an interrupt-disabled section.

FIG. 4 illustrates a case where an urgent interrupt is delivered to a CPU core, such as the first and second CPU cores CPU1 and CPU2 shown in FIG. 3, located in the interrupt-disabled section 'DI'. Referring to FIG. 4, an urgent interrupt signal arriving at a CPU core located in the interrupt-disabled section 'DI' cannot be immediately processed by the CPU core. Accordingly, the processing of the urgent interrupt signal is delayed until it becomes possible. When the CPU core enters the interrupt-enabled section 'EN', that is, after the urgent interrupt signal is delayed for a period of time from its generation, an interrupt handler is executed.

Figure 5:
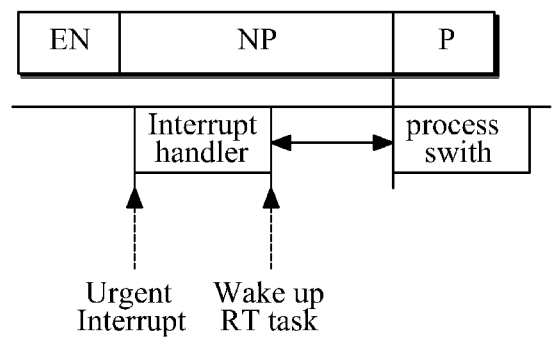
FIG. 5 is a diagram for explaining a case where an urgent interrupt is delivered to a CPU core located in a kernel non-preemptible section.

FIG. 5 illustrates a case where an urgent interrupt is delivered to a CPU core, such as the first and third CPU cores CPU1 and CPU3 shown in FIG. 3, located in the kernel non-preemptible section 'NP'. In the kernel non-preemptible section 'NP', even if a real-time process (also, referred to as a real-time task) is woken up by an urgent interrupt, a context switch or a process switch for switching to the real-time process is not allowed.

Referring to FIG. 5, when an urgent interrupt arrives at the interrupt-enabled section 'EN', an interrupt handler for the urgent interrupt can be immediately executed. However, when an urgent interrupt arrives at the kernel non-preemptible section 'NP', the process switch (or the context switch) to a high-priority, real-time process woken up by the interrupt handler is delayed until the kernel non-preemptible section 'NP' ends and kernel preemption becomes possible. Accordingly, preemption of a high-priority, real-time process for executing the urgent interrupt is delayed until the kernel preemptible section 'P' starts, as illustrated in FIG. 5.

Figure 6:
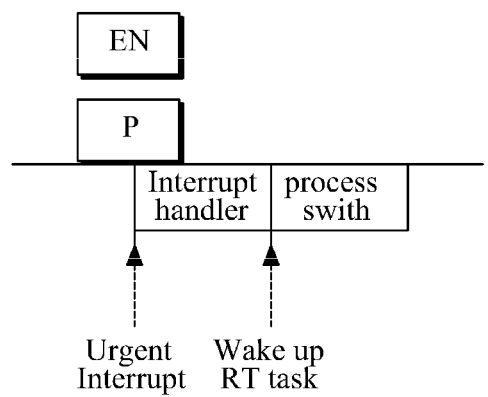
FIG. 6 is a diagram for explaining a case where an urgent interrupt is delivered to a CPU core located in an interrupt-enabled section and a kernel preemptible section.

FIG. 6 illustrates a case where an urgent interrupt is delivered to a CPU core, such as the fourth CPU core CPU4 shown in FIG. 3, located in the interrupt-enabled section 'EN' and the kernel preemptible section 'P'. In the case of FIG. 6, execution of an interrupt handler and the process switch (to a real-time process) can be immediately performed. That is, an urgent interrupt can be immediately processed by the CPU core located in the interrupt-enabled section 'EN' and the kernel preemptible section 'P'. Thus, the urgent interrupt can not only be processed, but also a period of time for which the processing of the urgent interrupt is delayed can be reduced or minimized.

Referring back to FIGS. 1A and 1B, using interrupt on/off information indicating whether each of CPU cores included in a target CPU set is currently located in the critical section or the non-critical section, the interrupt on/off manager 4 manages the CPU cores in the target CPU set such that one or more of the CPU cores are located in the non-critical section. That is, one or more of the CPU cores included in the target CPU set may be placed in a section in which an urgent interrupt can be executed (for example, the non-critical section) as shown in FIG. 6, and an urgent interrupt may be delivered to the CPU cores in this section. Accordingly, the urgent interrupt and a real-time process woke up by the urgent interrupt can be quickly (or within a minimum time delay) processed without being affected by the interrupt-disabled section 'DI' and/or the kernel non-preemptible section 'NP'.

When the multi-core computing system is to support execution of two urgent interrupts, the control unit 4b of the interrupt on/off manager 4 may control the CPU cores included in the target CPU set such that one or more of the CPU cores are located in the non-critical section. In this case, the multi-core computing system includes three or more CPU cores, and the target CPU set also includes three or more CPU cores. A case where CPU cores are controlled to execute two urgent interrupts is simply a quantitative expansion of a case where CPU cores are controlled to execute one urgent interrupt, and thus further description thereof will be omitted for conciseness.

The interrupt on/off manager 4 may be software included in the source code of an operating system or may be implemented using hardware. When the interrupt on/off manager 4 is hardware, modification of the source code of the operating system may not be needed. In this case, a CPU core intending to enter the interrupt-disabled section 'DI' or the kernel non-preemptible section 'NP' through the operating system may request the interrupt on/off manager 4 implemented as hardware to allow its entry into the interrupt-disabled section 'DI' or the kernel non-preemptible section 'NP'. Accordingly, based on the interrupt on/off information, the hardware (for example, the interrupt on/off manager 4) may immediately allow the CPU core to enter the interrupt-disabled section 'DI' or the kernel non-preemptible section 'NP', thereby preventing the CPU core to process an interrupt, or allowing the CPU core to enter the interrupt-disabled section 'DI' or the kernel non-preemptible section 'NP' after a predetermined delay time.

The interrupt on/off manager 4 may use the interrupt on/off information to control CPU cores included in a target CPU set. The interrupt on/off information may be information indicating whether each of the CPU cores included in the target CPU set is currently located in the critical section or the non-critical section. The term 'interrupt on/off information' has been arbitrarily chosen, and other terms may be used to refer to the same. The interrupt on/off information may be represented by an interrupt disable bit. In this case, when a CPU core is located in the critical section (the interrupt-disabled section 'DI' or the kernel non-preemptible section 'NP'), the interrupt on/off information for the CPU core may be set to '1.' When the CPU core is located in the non-critical section (the interrupt-enabled section 'EN' and the kernel preemptible section 'P'), the interrupt on/off information for the CPU core may be set to '0.' As another example, the interrupt on/off information may be represented by an interrupt enable bit. In this case, the values '0' and '1' may be reversed from the previous case. Thus, for conciseness, the case where the interrupt on/off information is represented by the interrupt enable bit will not be further described.

The interrupt on/off information for all CPU cores included in a target CPU set may be represented by a bitmap and stored accordingly in a predetermined storage device (for example, a shared memory of the multi-core computing system). For example, if four CPU cores are included in a target CPU set, the interrupt on/off information for the four CPU cores may use a 4-bit bitmap to indicate whether each of the CPU cores is currently located in the critical section or the non-critical section. Here, a bit at each bit position in the 4-bit bitmap indicates a CPU core included in the target CPU set. For example, bits from most significant to least significant may sequentially and respectively indicate a fourth CPU core, a third CPU core, a second CPU core, and a first CPU core.

The interrupt on/off information may be updated when the current state of at least one of CPU cores included in a target CPU set changes. In another example, the interrupt on/off information may be periodically updated regardless of whether the current state of at least one of the CPU cores included in the target CPU set changes. The interrupt on/off information may be changed directly by a CPU core whose current state has changed and/or by the interrupt on/off manager 4 (for example, the control unit 4b). When the interrupt on/off information needs to be updated, the interrupt on/off manager 4 may synchronize the interrupt on/off information with the current state of each CPU core through information exchange with each CPU core.

The interrupt on/off manager 4 may also manage target CPU set information. For example, the target designation unit 4c of the interrupt on/off manager 4 may manage the target CPU set information. As described above, the target designation unit 4c of the interrupt on/off manager 4 may determine the type and/or number of CPU cores included in a target CPU set among all CPU cores included in the multi-core computing system. In another example, each CPU core may join or leave a target CPU set through information exchange (for example, a request for joining to a target CPU set or a request for leaving the target CPU set) with the interrupt on/off manager 4 (for example, the target designation unit 4c). Information about inclusion or exclusion of each CPU core in/from a target CPU set may refer to the target CPU set information and may be implemented by a target CPU bit or the like. This information may be stored in the interrupt on/off manager 4 or the shared memory and may be managed accordingly.

The control unit 4b of the interrupt on/off manager 4 may control movement of CPU cores, which are included in a target CPU set, from the non-critical section to the critical section, so that at least one of the CPU cores is located in the non-critical section. In this case, the control unit 4b of the interrupt on/off manager 4 may control entry of the CPU cores into all the critical sections or parts of the critical sections which are selected based on a predetermined standard.

In the former case, the control unit 4b of the interrupt on/off manager 4 may itself control the CPU cores' entry into the all critical sections. In the latter case, the control unit 4b of the interrupt on/off manager 3 may control the CPU cores' entry into the particular critical sections. For example, when the execution time of the interrupt-disabled section 'DI' or the kernel non-preemptible section 'NP' is short (that is, when the execution time is shorter than a predetermined period of time), the control unit 4b may allow a CPU core to enter the critical section. However, when the execution time of the interrupt-disabled section 'DI' or the kernel non-preemptible section 'NP' is longer than the predetermined period of time, the control unit 4b may control entry of the CPU core into the critical section. If the interrupt on/off manager 4 controls entry of CPU cores, which are included in a target CPU set, into the particular critical sections, there may be fewer cases where a CPU core attempting to enter the interrupt-disabled section 'DI' or the kernel non-preemptible section 'NP' has to wait until it is allowed to enter the interrupt-disabled section 'DI' or the kernel non-preemptible section 'NP' than when the interrupt on/off manager 4 controls entry of the CPU cores into all the critical sections. Accordingly, utilization of the CPU cores included in the target CPU set can be improved. The following description is based on a case where the interrupt on/off manager 4 controls entry of CPU cores into all the critical sections. However, it is understood that similar description can be applied to a case where the interrupt on/off manager 4 controls entry of CPU cores into the particular critical sections.

Figure 7:
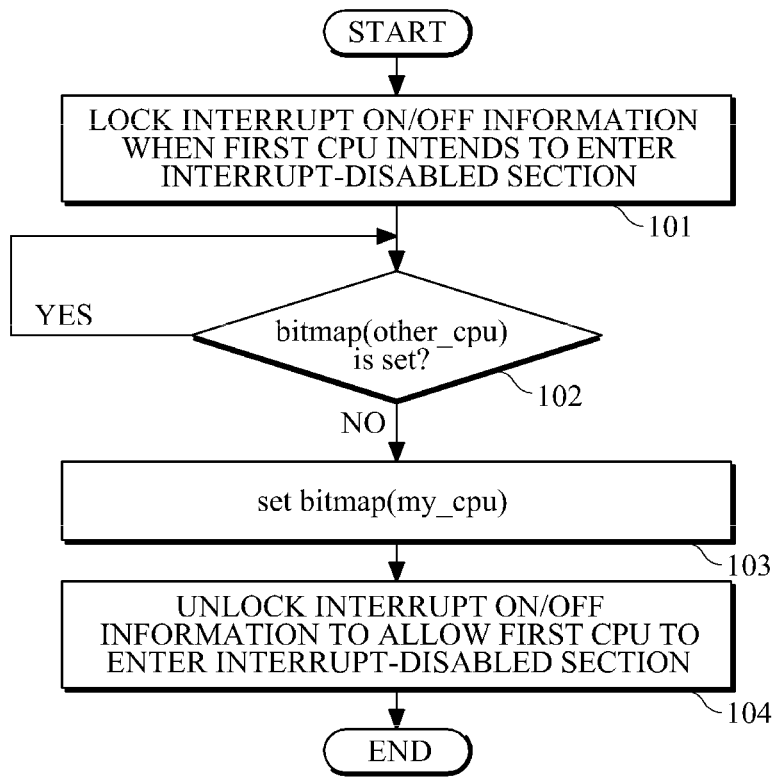
FIG. 7 is a flowchart illustrating a process of controlling the movement of a CPU core from an interrupt-enabled section to an interrupt-disabled section.

FIG. 7 shows an example process in which the control unit 4b of the interrupt on/off manager 4 controls the movement of a CPU core from the non-critical section to the critical section. With respect to the process of FIG. 7, a CPU core is located in the interrupt-disabled section 'DI' as the critical section and is located in the interrupt-enabled section 'EN' as the non-critical section.

Referring to FIG. 7, when any one (for example, a first CPU core) of m CPU cores included in a target CPU set intends to enter the interrupt-disabled section 'DI', the interrupt on/off manager 4 locks interrupt on/off information (bitmap) for all of the m CPU cores (operation 101). This is to prevent problems with synchronization of the interrupt on/off information (bitmap) resulting from an update of the interrupt on/off information (bitmap) simultaneously by two different CPU cores. When intending to enter the interrupt-disabled section 'DI', the first CPU core may lock the interrupt on/off information on its own or by exchanging signals with the interrupt on/off manager 4. Then, the first CPU core may perform an operation 102 which will be described later. By communicating with the first CPU core, the interrupt on/off manager 4 can identify the intent of the first CPU core to enter the interrupt-disabled section 'DI'.

The determination unit 4a of the interrupt on/off manager 4 determines whether all of (m−1) CPU cores (other_cpu) excluding the first CPU core among the m CPU cores included in the target CPU set are located in the interrupt-disabled section 'DI' (operation 102). Here, the determination unit 4a may use the locked interrupt on/off information. For example, if the interrupt on/off information is represented by a bitmap of interrupt disable bits, the determination unit 4a may determine whether all of the interrupt disable bits corresponding respectively to the (m−1) CPU cores (other_cpu) excluding the first CPU core have been set to '1.' When determining that all of the (m−1) CPU cores are located in the interrupt-disabled section 'DI', that is, when all of the interrupt disable bits in the bitmap are '1,' the control unit 4b of the interrupt on/off manager 4 does not allow the first CPU core to enter the interrupt-disabled section 'DI'. Then, the determination unit 4a of the interrupt on/off manager 4 repeats the operation 102. The determination unit 4a may repeat the operation 102 periodically or at a predetermined time and/or a predetermined number of times.

If the control unit 4b allows the first CPU core to enter the interrupt-disabled section 'DI' even when all of the (m−1) CPU cores are located in the interrupt-disabled section 'DI', all of the m CPU cores included in the target CPU set may be in the interrupt-disabled section. In this case, an urgent interrupt cannot be processed. Therefore, in the example provided, the determination unit 4a repeats the operation 102 to prevent a situation in which all of the m CPU cores included in the target CPU set are in the interrupt-disabled section 'DI'. The determination unit 4a repeats the operation 102 until at least one of the (m−1) CPU cores moves from the interrupt-disabled section 'DI' to the interrupt-enabled section 'EN'. After identifying that at least one of the (m−1) CPU cores is located in the interrupt-enabled section 'EN', the control unit 4b of the interrupt on/off manager 4 allows the first CPU core to enter the interrupt-disabled section 'DI'.

In other words, when it is determined in the operation 102 that at least one of the (m−1) CPU cores is located in the interrupt-enabled section 'EN', that is, when at least one of the interrupt disable bits in the bitmap is '0,' the control unit 4b of the interrupt on/off manager 4 allows the first CPU core to enter the interrupt-disabled section 'DI'. This is because even if the first CPU core enters the interrupt-disabled section 'DI', at least one urgent interrupt can be processed when at least one of the (m−1) CPU cores is located in the interrupt-enabled section 'EN'.

Accordingly, the interrupt on/off manager 4 or the first CPU core sets the interrupt on/off information for the first CPU core to the interrupt-disabled section 'DI' (operation 103). That is, an interrupt disable bit (my_cpu) corresponding to the first CPU core in the bitmap is set to '1.' Then, the control unit 4b of the interrupt on/off manager 4 unlocks the interrupt on/off information, thereby allowing the first CPU core to enter the interrupt-disabled section 'DI' (operation 104). That is, the first CPU core unlocks the interrupt on/off information and then enters the interrupt-disabled section 'DI'.

In the example provided, it is not necessary for the control unit 4b of the interrupt on/off manager 4 to control the movement of a CPU core from the critical section to the non-critical section. However, this does not exclude the fact that the interrupt on/off manager 4 can control the movement of a CPU core from the critical section to the non-critical section, as apparent from the disclosure herein. Even if the interrupt on/off manager 4 does not control the movement of a CPU core from the critical section to the non-critical section, as the cases may be, it may need to know which CPU core moves from the critical section to the non-critical section.

Figure 8:
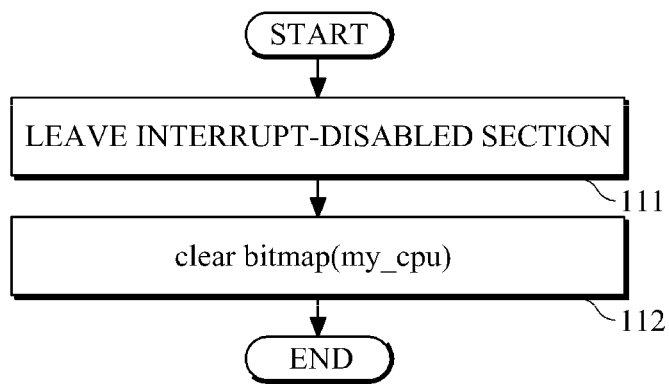
FIG. 8 is a flowchart illustrating a process in which a CPU core moves from the interrupt-disabled section to the interrupt-enabled section.

FIG. 8 shows an example process in which a CPU core moves from the critical section to the non-critical section. With respect to the process of FIG. 8, a CPU core is located in the interrupt-disabled section 'DI' which is the critical section and a CPU core is located in the interrupt-enabled section 'EN' which is the non-critical section. Referring to FIG. 8, when a first CPU located in the interrupt-disabled section 'DI' intends to enter the interrupt-enabled section 'EN', it can enter the interrupt-enabled section 'EN' without any restrictions (operation 111). Accordingly, the first CPU core or the interrupt on/off manager 4 sets interrupt on/off information for the first CPU core (that is, an interrupt disable bit (my_cpu) corresponding to the first CPU core in a bitmap) to '0' (operation 112). In the latter case where the subject of the operation 112 is the interrupt on/off manager 4, the interrupt on/off manager 4 may unlock the interrupt on/off information for the first CPU core by exchanging signals with the first CPU core.

Figure 9:
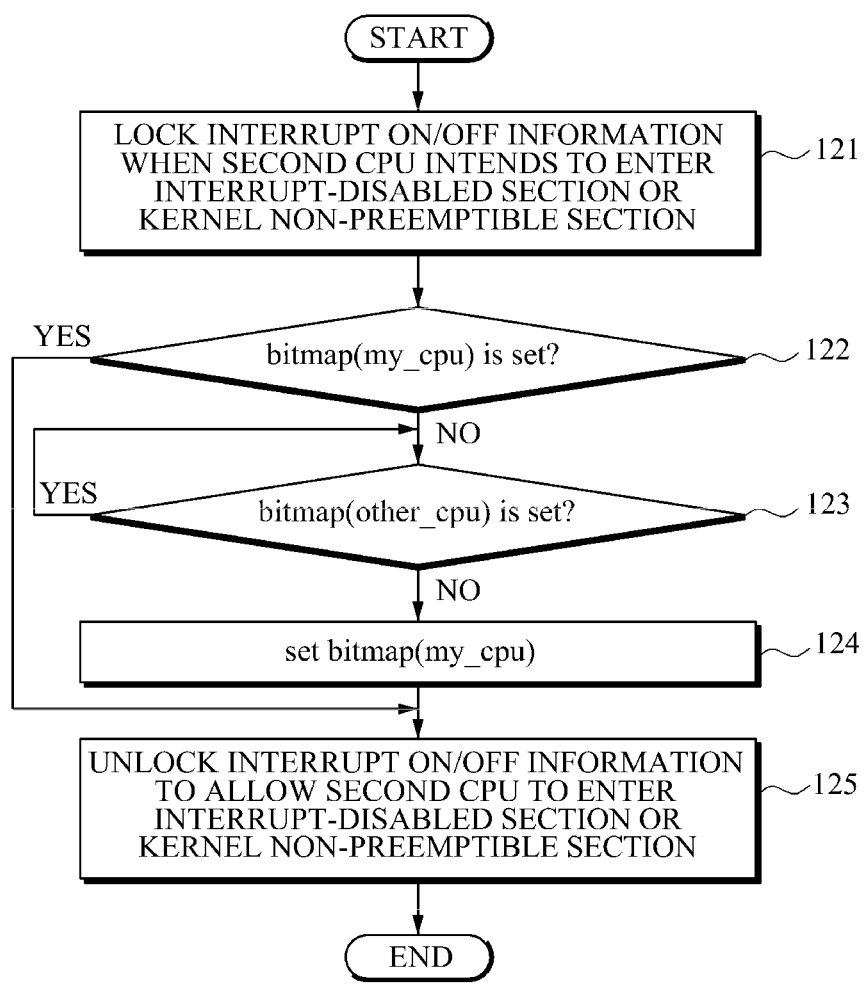
FIG. 9 is a flowchart illustrating a process of controlling the entry of a CPU core into the interrupt-disabled section or the kernel non-preemptible section.

FIG. 9 shows another example process in which the control unit 4b of the interrupt on/off manager 4 controls the movement of a CPU core from the non-critical section to the critical section. With respect to the process of FIG. 9, a CPU core is located in the interrupt-disabled section 'DI' or the kernel non-preemptible section 'NP' as the critical section and is located in both of the interrupt-enabled section 'EN' and the kernel preemptible section 'P' as the non-critical section.

Referring to FIG. 9, when any one (for example, a second CPU core) of m CPU cores included in a target CPU set intends to enter the interrupt-disabled section 'DI' or the kernel non-preemptible section 'NP', the interrupt on/off manager 4 or the second CPU core locks interrupt on/off information (bitmap) for all of the m CPU cores (operation 121). This is to prevent a problem with synchronization of the interrupt on/off information (bitmap) resulting from simultaneous updating of the interrupt on/off information (bitmap) by two different CPU cores. When intending to enter the interrupt-disabled section 'DI' or the kernel non-preemptible section 'NP', the second CPU core may lock the interrupt on/off information by exchanging signals with the interrupt on/off manager 4. Then, the second CPU core may perform an operation 122 which will be described later. By communicating with the second CPU core, the interrupt on/off manager 4 can identify the intent of the second CPU core to enter the interrupt-disabled section 'DI' or the kernel non-preemptible section 'NP'.

The determination unit 4a of the interrupt on/off manager 4 checks the current state of the second CPU core based on the interrupt on/off information and determines whether the second CPU core is located in the critical section (the kernel non-preemptible section 'NP' or the interrupt-disabled section 'DI') (operation 122). Operation 122 may be performed by the second CPU core, for example, and not by the interrupt on/off manager 4. In this case, the second CPU core determines whether it is currently in the critical section based on the interrupt on/off information.

When it is determined that the interrupt on/off information for the second CPU core has been set, the interrupt on/off information (bitmap) for all of the m CPU cores, which was locked in the operation 121, is unlocked so that the second CPU core can enter the kernel non-preemptible section 'NP' or the interrupt-disabled section 'DI' (operation 125). If it is determined that the interrupt on/off information for the second CPU core has been set, then the second CPU core has already entered the kernel non-preemptible section 'NP' and is attempting to enter the interrupt-disabled section 'DI' or has already entered the interrupt-disabled section 'DI' and is attempting to enter the kernel non-preemptible section 'NP'. Therefore, since the second CPU core has already entered the critical section, that is, the interrupt-disabled section 'DI' or the kernel non-preemptible section 'NP', the control unit 4b of the interrupt on/off manager 4 may allow the second CPU core to enter the kernel non-preemptible section 'NP' or the interrupt-disabled section 'DI'.

On the other hand, when it is determined that the interrupt on/off information for the second CPU core has not been set, the determination unit 4a of the interrupt on/off manager 4 determines whether any of (m−1) CPU cores (other_cpu) excluding the second CPU core among the m CPU cores included in the target CPU set is located in the interrupt-disabled section 'DI' or the kernel non-preemptible section 'NP' based on the stored interrupt on/off information (operation 123). For example, if the interrupt on/off information is represented by a bitmap of interrupt disable bits, the determination unit 4a may determine whether any of the interrupt disable bits corresponding respectively to the (m−1) CPU cores (other_cpu) excluding the second CPU core has been set to '1.' When determining that all of the (m−1) CPU cores are located in the interrupt-disabled section 'DI' or the kernel non-preemptible section 'NP', that is, when all of the interrupt disable bits in the bitmap are '1,' the control unit 4b of the interrupt on/off manager 4 does not allow the second CPU core to enter the interrupt-disabled section 'DI' or the kernel non-preemptible section 'NP'. Then, the determination unit 4a of the interrupt on/off manager 4 repeats the operation 123.

If the control unit 4b allows the second CPU core to enter the interrupt-disabled section 'DI' or the kernel non-preemptible section 'NP' even when all of the (m−1) CPU cores are located in the interrupt-disabled section 'DI' or the kernel non-preemptible section 'NP', all of the m CPU cores included in the target CPU set are in the interrupt-disabled section 'DI' or the kernel non-preemptible section 'NP'. In this case, none of the m CPU cores included in the target CPU set can process an urgent interrupt. Therefore, in the example provided, the operation 123 is repeated to prevent a situation in which all of the m CPU cores included in the target CPU set are in the interrupt-disabled section 'DI' or the kernel non-preemptible section 'NP'. Operation 123 may be repeated until at least one of the (m−1) CPU cores enters the interrupt-enabled section 'EN' and the kernel preemptible section 'P'. Then, the interrupt on/off manager 4 allows the second CPU core to enter the interrupt-disabled section 'DI' or the kernel non-preemptible section 'NP'.

For example, when it is determined in the operation 123 that at least one of the (m−1) CPU cores is located in the interrupt-enabled section 'EN' and the kernel preemptible section 'P', that is, when at least one of the interrupt disable bits in the bitmap is '0' the control unit 4b of the interrupt on/off manager 4 allows the second CPU core to enter the interrupt-disabled section 'DI' or the kernel non-preemptible section 'NP'. This is because even if the second CPU core enters the interrupt-disabled section 'DI' or the kernel non-preemptible section 'NP', at least one urgent interrupt can be processed when at least one of the (m−1) CPU cores is located in the interrupt-enabled section 'EN' or the kernel preemptible section 'P'.

Accordingly, the interrupt on/off manager 4 sets the interrupt on/off information for the second CPU core to the interrupt-disabled section 'DI' or the kernel non-preemptible section 'NP' (operation 124). That is, an interrupt disable bit (my_cpu) corresponding to the second CPU core in the bitmap is set to '1.' Operation 124 may also be performed by the second CPU core. Next, the control unit 4b of the interrupt on/off manager 4 unlocks the interrupt on/off information, thereby allowing the second CPU core to enter the kernel non-preemptible section 'NP' or the interrupt-disabled section 'DI' (operation 125). That is, the second CPU core unlocks the interrupt on/off information and then enters the kernel non-preemptible section 'NP' or the interrupt-disabled section 'DI'.

In the example provided, it is not necessary for the control unit 4b of the interrupt on/off manager 4 to control movement of a CPU core from the critical section to the non-critical section. However, this does not exclude the fact that the interrupt on/off manager 4 can control the movement of a CPU core from the critical section to the non-critical section, as apparent from the disclosure herein. Even if the interrupt on/off manager 4 does not control the movement of a CPU core from the critical section to the non-critical section, as the cases may be, it may need to know which CPU core moves from the critical section to the non-critical section.

Figure 10A:
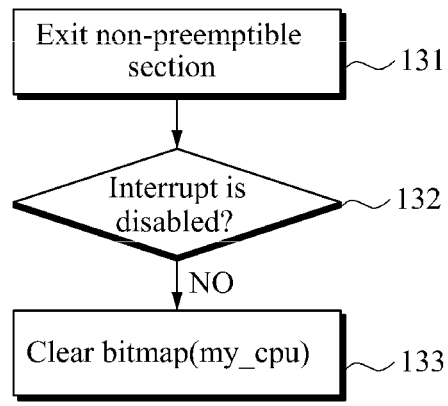
FIGS. 10A and 10B are flowcharts illustrating a process in which a CPU core enters the interrupt-enabled section and the kernel non-preemptible section, respectively.
Figure 10B:
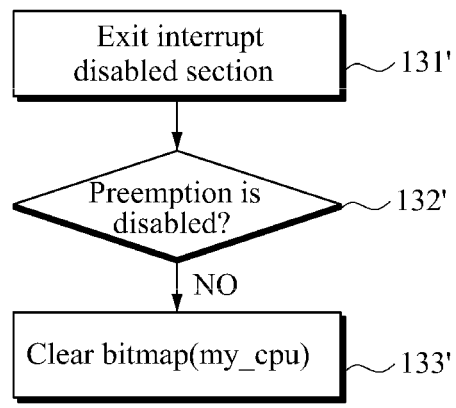

FIGS. 10A and 10B show an example process in which a CPU core moves from the critical section to the non-critical section. FIG. 10A shows a case where a CPU core moves from the kernel non-preemptible section 'NP' to the kernel preemptible section 'P', and FIG. 10B shows a case where a CPU core moves from the interrupt-disabled section 'DI' to the interrupt-enabled section 'EN'.

Referring to FIGS. 10A and 10B, when a second CPU core located in the kernel non-preemptible section 'NP' or the interrupt-disabled section 'DI' intends to enter the kernel preemptible section 'P' or the interrupt-enabled section 'EN', it can enter the kernel preemptible section 'P' or the interrupt-enabled section 'EN' without restrictions (operation 131 and operation 131'). The second CPU core or the determination unit 4a of the interrupt on/off manager 4 determines whether the second CPU core is located in the interrupt-enabled section 'EN' or the kernel preemptible section 'P' (operation 132 and operation 132'). When it is determined that the second CPU core is located in the interrupt-enabled section 'EN' or the kernel preemptible section 'P', the second CPU core or the interrupt on/off manager 4 sets interrupt on/off information for the second CPU core (that is, an interrupt disable bit (bitmap (my_cpu)) corresponding to the second CPU core in a bitmap) to '0' (operation 133 and operation 133'). In the latter case where the subject of the operation 133 and operation 133' is the interrupt on/off manager 4, the interrupt on/off manager 4 may unlock the interrupt on/off information for the second CPU core by exchanging signals with the second CPU core.

FIG. 11 shows an example interrupt on/off management method for a multi-core processor, based on, for example, the flowchart of FIG. 7. With respect to the method of FIG. 11, two (for example, a third CPU core CPU3 and a fourth CPU core CPU4) of four CPU cores included in a multi-core computing system are included in a target CPU set. Initially, interrupt on/off information (bitmap) represented by interrupt disable bits is set to '0000,' and the interrupt disable bits, from most significant to least significant, sequentially and respectively indicate the fourth CPU core CPU4, the third CPU core CPU3, a second CPU core CPU2, and a first CPU core CPU1. While the example of FIG. 11 will be described using each CPU core as the instigator of action, this does not exclude the fact that the interrupt on/off manager 4 can control all or part of each CPU core's action, as apparent from the disclosure herein.

Referring to FIG. 11, when intending to enter the interrupt-disabled section 'DI', the third CPU core CPU3 checks an interrupt disable bit, which corresponds to the other CPU core (for example, the fourth CPU core CPU4) in the target CPU set, in the bitmap. In FIG. 11, since the interrupt disable bit corresponding to the fourth CPU core CPU4 is '0,' the third CPU core CPU3 sets its interrupt disable bit to '1,' thereby setting the bitmap to '0100.' Accordingly, the third CPU core CPU3 enters the interrupt-disabled section 'DI'. When intending to leave the interrupt-disabled section 'DI', the third CPU core CPU3 changes its interrupt disable bit to '0,' thereby setting the bitmap to '0000.' And, the third CPU core CPU3 enters the interrupt-enabled section 'EN'.

When the fourth CPU core CPU4 intends to enter the interrupt-disabled section 'DI', it checks the interrupt disable bit corresponding to the other CPU core (for example, the third CPU core CPU3) in the bitmap. Since the interrupt disable bit corresponding to the third CPU core CPU3 is '0,' the fourth CPU core CPU4 sets its interrupt disable bit to '1,' thereby setting the bitmap to '1000.' Accordingly, the fourth CPU core CPU4 enters the interrupt-disabled section 'DI'. When intending to enter the interrupt-disabled section 'DI' while the fourth CPU core CPU4 is in the interrupt-disabled section 'DI', the third CPU core CPU3 checks the interrupt disable bit corresponding to the other CPU core (for example, the fourth CPU core CPU3) in the bitmap.

Since the interrupt disable bit corresponding to the fourth CPU core CPU4 has been set to '1,' the third CPU core CPU3 waits until the interrupt disable bit corresponding to the fourth CPU core CPU4 becomes '0,' that is, until the fourth CPU core CPU4 enters the interrupt-enabled section 'EN'. When intending to enter the interrupt-enabled section 'EN', the fourth CPU core CPU4 changes its interrupt disable bit to '0,' thereby setting the bitmap to '0000.' And, the fourth CPU core CPU4 leaves the interrupt-disabled section 'DI'. Thereafter, the third CPU core CPU3 changes its interrupt disable bit to '1,' thereby setting the bitmap to '0100.' As such, the third CPU core CPU3 enters the interrupt-disabled section 'DI'. As illustrated in the example method, a situation in which all CPU cores included in a target CPU set being located in the interrupt-disabled section 'DI' can be prevented.

Referring back to FIGS. 1A and 1B, the multi-core computing system may further include an interrupt dispatcher 6. When an interrupt occurs in the multi-core computing system, the interrupt dispatcher 6 delivers the interrupt to some of the n (≥2) CPU cores 2a through 2n. In the example provided, the interrupt dispatcher 6 may deliver an urgent interrupt to any one of the m CPU cores included in the target CPU set among the n CPU cores 2a through 2n or may broadcast the urgent interrupt to all of the m CPU cores.

When an urgent interrupt occurs, the interrupt delivery unit 4d of the interrupt on/off manager 4 may control the interrupt dispatcher 6 to deliver the urgent interrupt only to a CPU core located in the non-critical section. In this case, the interrupt dispatcher 6 may be a block (hardware or software) separate from the interrupt on/off manager 4. In another example, the interrupt dispatcher 6 may be a block included in the interrupt on/off manager 4. In this case, the interrupt delivery unit 4d may function as an interrupt dispatcher.

An interrupt dispatch table may be used to deliver an important interrupt to a CPU core located in the non-critical section, among CPU cores included in a target CPU set. The interrupt dispatch table may contain information about which interrupt should be processed by which CPU core. The interrupt dispatch table may be the same as the interrupt on/off information described above. For example, whenever each CPU core moves between the critical section and the non-critical section, each CPU core (or the interrupt on/off manager 4) may modify the interrupt dispatch table. Using the interrupt dispatch table, the interrupt on/off manager 4 may control an urgent interrupt to be delivered to a CPU core located in the non-critical section.

When only one of CPU cores included in a target CPU set is located in the non-critical section, the interrupt on/off manager 4 may deliver an urgent interrupt only to the CPU core located in the non-critical section. When two or more of the CPU cores included in the target CPU set are located in the non-critical section, the interrupt on/off manager 4 may select one of the CPU cores located in the non-critical section by using a predetermined algorithm and deliver the urgent interrupt only to the selected CPU core. The predetermined algorithm is not limited to a particular algorithm. For example, the urgent interrupt may be delivered to a CPU core which is executing a lowest-priority process, a CPU core which has the lowest load, or a CPU core which has executed a corresponding process before.

The interrupt on/off manager 4 may also control the interrupt dispatcher 6 to simultaneously broadcast the urgent interrupt to two or more CPU cores. In this case, the interrupt dispatcher 6 is configured to support interrupt broadcasting. Of the CPU cores which receive the broadcast urgent interrupt, a CPU core located in the non-critical section (the interrupt-enabled section 'EN' or the interrupt-enabled section 'EN' and the kernel preemptible section 'P') may process the urgent interrupt, and the other CPU cores may ignore the urgent interrupt. In such case, the interrupt on/off manager 4 controls CPU cores included in a target CPU set such that only one of the CPU cores is located in the non-critical section. When two or more of the CPU cores included in the target CPU set are located in the non-critical section, the interrupt on/off manager 4 may select one of the CPU cores based on priority and control the selected CPU core to process the urgent interrupt.

Figure 12:
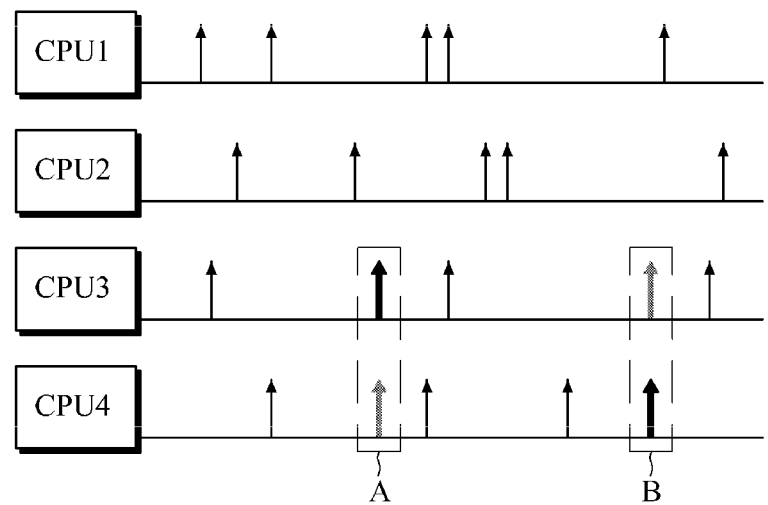
FIG. 12 is a diagram illustrating an example interrupt broadcasting when an urgent interrupt is a local timer interrupt.

FIG. 12 illustrates an example of interrupt broadcasting when an urgent interrupt is a local timer interrupt. Each CPU core included in a multi-core computing system may have its own local timer interrupt, and the local timer interrupt may cause each CPU core to wake up a particular process at a particular time. When applying interrupt broadcasting to the local timer interrupt, each local timer interrupt may be delivered only to a corresponding CPU core. Thus, a local timer interrupt for a particular CPU core may not be delivered to other CPU cores in the interrupt-enabled section TV/kernel preemptible section 'P'. This may present a problem since the local timer interrupt is frequently used in scheduling of real-time processes.

Accordingly, when an urgent interrupt is a local timer interrupt, the interrupt on/off manager 4 delivers the urgent interrupt to all CPU cores included in a target CPU set by using the interrupt broadcasting described above. When setting an important local timer interrupt for any one of CPU cores included in a target CPU set, the interrupt on/off manager 4 also sets the local timer interrupt for the other CPU cores included in the target CPU set, so that the same interrupt occurs at the same time at all CPU cores in the target CPU set.

Referring to FIG. 12, a third CPU core CPU3 and a fourth CPU core CPU4 are included in a target CPU set. In this case, when an important local timer interrupt is set for the third CPU core CPU3, the fourth CPU core CPU4 is also set so that the same interrupt can occur at the same time for the fourth CPU core CPU4 (see region 'A' in FIG. 12). Similarly, when an important local timer interrupt is set for the fourth CPU core CPU4, the third CPU core CPU3 is also set so that the same interrupt can occur at the same time for the third CPU core CPU3 (see region 'B' in FIG. 12). In this way, a local timer interrupt for a particular CPU core can be broadcast to other CPU cores. In the above example, one of the third and fourth CPU cores CPU3 and CPU4, which is located in the non-critical section, processes the local timer interrupt.

To process a local timer interrupt, CPU cores included in a target CPU set may exchange information. For example, the CPU cores may exchange information about the time when a local timer interrupt of each CPU core occurred or information about a function that must be executed by each local timer interrupt. The CPU cores may exchange information with each other directly or through the interrupt on/off manager 4.

Figure 13:
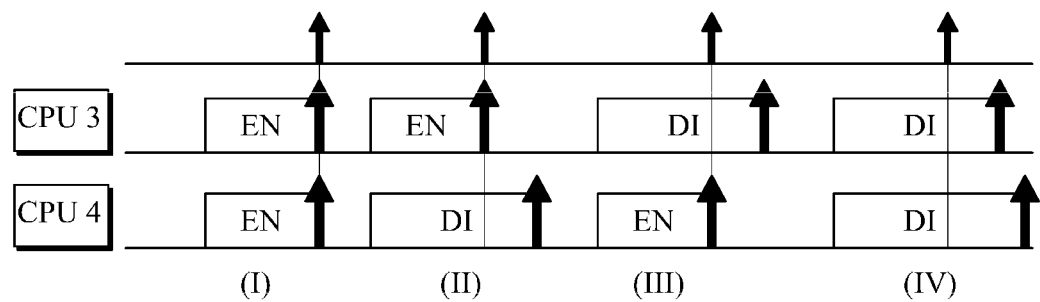
FIG. 13 is a diagram illustrating four scenarios that may occur when an urgent interrupt is delivered using interrupt broadcasting.

FIG. 13 illustrates four scenarios that may occur when an urgent interrupt is broadcast to, for example, two CPU cores (for example, a third CPU core CPU3 and a fourth CPU core CPU4) included in a target CPU set. In FIG. 13 example, the critical section includes the interrupt-disabled section 'DI', and the non-critical section includes the interrupt-enabled section 'EN'. However, it is understood that the description of FIG. 13 can also be applied to a case where the critical section includes the interrupt-disabled-section 'DI' and the kernel non-preemptible section 'NP', and the non-critical section includes the interrupt-enabled section 'EN' and the kernel preemptible section 'P'.

Referring to (I) of FIG. 13, if an urgent interrupt occurs when the third and fourth CPU cores CPU3 and CPU4 are located in the interrupt-enabled section 'EN', they can immediately process the urgent interrupt. Therefore, a period of time for which the processing of the urgent interrupt is delayed can be reduced or minimized Referring to (II) of FIG. 13, an urgent interrupt may occur when the third CPU core CPU3 is located in the interrupt-enabled section 'EN' while the fourth CPU core CPU4 is located in the interrupt-disabled section 'DI'. In this case, while the fourth CPU core CPU4 cannot immediately process the urgent interrupt, the third CPU core CPU3 can immediately process the urgent interrupt. Therefore, a period of time for which the processing of the urgent interrupt is delayed can be reduced or minimized. Referring to (III) of FIG. 13, an urgent interrupt may occur when the third CPU core CPU3 is located in the interrupt-disabled section 'DI' while the fourth CPU core CPU4 is located in the interrupt-enabled section 'EN'. In this case, while the third CPU core CPU3 cannot immediately process the urgent interrupt, the fourth CPU core CPU4 can immediately process the urgent interrupt. Therefore, a period of time for which the processing of the urgent interrupt is delayed can be reduced or minimized.

As in the example provided, if CPU cores included in a target CPU set are controlled such that at least one of the CPU cores is located in the interrupt-enabled section 'EN', even when the interrupt dispatcher 6 broadcasts an urgent interrupt to all CPU cores, a period of time for which the processing of the urgent interrupt is delayed can be reduced or minimized. On the other hand, referring to (IV) of FIG. 13, if an urgent interrupt occurs when both of the third and fourth CPU cores CPU3 and CPU4 are located in the interrupt-disabled section 'DI', the urgent interrupt cannot be processed by the third and fourth CPU cores CPU3 and CPU4. Therefore, a delay in the processing of the urgent interrupt may be unavoidable.

As described above, if CPU cores included in a target CPU set are controlled such that at least one (or two) of the CPU cores is located in the non-critical section (the interrupt-enabled section 'EN' or the interrupt-enabled section 'EN' and the kernel preemptible section 'P'), a delay in processing of an urgent interrupt (such as a real-time process) can be prevented or reduced or minimized. While the interrupt on/off manager 4 and the multi-core computing system including the same have been described above with reference to FIGS. 1A and 1B, it is understood to be only a non-limiting example.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interrupt on/off management apparatus for a multi-core processor comprising n ($\geq 2$) central processing unit (CPU) cores, the apparatus comprising:
    a determination unit configured to determine whether one or more of m ($2 \leq m \leq n$) CPU cores included in a target CPU set among the n CPU cores is located in a critical section or a non-critical section based on interrupt on/off information indicating a section in which each of the m CPU cores is located; and
    a control unit configured to control the m CPU cores such that one or more of the m CPU cores are located in the non-critical section, based on the determination result of the determination unit,
    wherein the determination unit is operatively connected to the control unit.

2. The apparatus of claim 1, wherein the control unit controls entry of a first CPU core, which is located in the non-critical section among the m CPU cores, into the critical section.

3. The apparatus of claim 2, wherein in response to the determination unit determining that all of (m−1) CPU cores excluding the first CPU core among the m CPU cores are located in the critical section, the control unit prevents the first CPU core from entering the critical section.

4. The apparatus of claim 2, wherein the control unit controls entry of the first CPU core into the critical section in response to an execution time of the critical section being longer than a predetermined period of time.

5. The apparatus of claim 1, wherein the critical section comprises an interrupt-disabled section, and the non-critical section comprises an interrupt-enabled section.

6. The apparatus of claim 1, wherein the critical section comprises at least one of an interrupt-disabled section and a kernel non-preemptible section, and the non-critical section comprises at least one of an interrupt-enabled section and a kernel preemptible section.

7. The apparatus of claim 1, further comprising a target designation unit configured to designate a type, a number, or the type and the number of CPU cores included in the target CPU set among the n CPU cores.

8. The apparatus of claim 1, further comprising an interrupt delivery unit configured to deliver an urgent interrupt to any one of the CPU cores located in the non-critical section or broadcast the urgent interrupt to all of the m CPU cores included in the target CPU set, based on the determination result of the determination unit.

9. The apparatus of claim 8, wherein the urgent interrupt comprises a local timer interrupt, and the interrupt delivery unit delivers information so as to execute the local timer interrupt between the m CPU cores included in the target CPU set.

10. The apparatus of claim 8, wherein the interrupt delivery unit delivers the urgent interrupt or controls an interrupt dispatcher, which is separate from the interrupt delivery unit, to deliver the urgent interrupt.

11. The apparatus of claim 1, wherein m and n are integers equal to or greater than three, and the control unit controls the m CPU cores such that at least two of the m CPU cores included in the target CPU set are located in the non-critical section.

12. An interrupt on/off management method for a multi-core processor comprising n ($\geq 2$) CPU cores, the method comprising:
    determining whether one or more of m ($2 \leq m \leq n$) CPU cores included in a target CPU set among the n CPU cores is located in a critical section or a non-critical section based on interrupt on/off information indicating a section in which each of the m CPU cores is located; and
    controlling the m CPU cores such that at least one of the m CPU cores is located in the non-critical section, based on the determination.

13. The method of claim 12, wherein:
    the critical section comprises an interrupt-disabled section, and the non-critical section comprises an interrupt-enabled section, and
    the controlling of the m CPU cores comprises controlling a first CPU core, which is located in the interrupt-enabled section among the m CPU cores, to enter into the interrupt-disabled section.

14. The method of claim 13, further comprising:
    locking state information of the m CPU cores included in the target CPU set before the determining of whether the one or more of the m ($2 \leq m \leq n$) CPU cores included in the target CPU set among the n CPU cores is located in the critical section or the non-critical section,
    wherein in response to the determination that all of the (m−1) CPU cores are located in the interrupt-disabled section, the first CPU core is prevented from entering the interrupt-disabled section during the controlling of the m CPU cores, and the determining of whether each of the m ($2 \leq m \leq n$) CPU cores included in the target CPU set among the n CPU cores is located in the critical section or the non-critical section is repeated.

15. The method of claim 13, further comprising:
    locking state information of the m CPU cores included in the target CPU set before the determining of whether the one or more of the m ($2 \leq m \leq n$) CPU cores included in the target CPU set among the n CPU cores is located in the critical section or the non-critical section; and
    unlocking the state information of the m CPU cores to allow the first CPU core to enter the interrupt-disabled section in response to the determination that at least one of the (m−1) CPU cores is located in the interrupt-enabled section.

16. The method of claim 12, wherein:

the critical section comprises at least one of an interrupt-disabled section and a kernel non-preemptible section, and the non-critical section comprises at least one of an interrupt-enabled section and a kernel preemptible section, and the controlling of the m CPU cores comprises controlling a first CPU core, which is located in the non-critical section among the m CPU cores, to enter into the critical section.

17. The method of claim 16, further comprising:

locking state information of the m CPU cores included in the target CPU set before the determining of whether the one or more of the m (2≤m≤n) CPU cores included in the target CPU set among the n CPU cores is located in the critical section or the non-critical section;

determining whether the first CPU core is located in the critical section or the non-critical section before the determining of whether the one or more of the m (2≤m≤n) CPU cores included in the target CPU set among the n CPU cores is located in the critical section or the non-critical section; and unlocking the state information of the m CPU cores to allow the first CPU core to enter the interrupt-enabled section or the kernel preemptible section in response to the determination that the first CPU core is located in the critical section.

18. The method of claim 16, further comprising, before the determining of whether each of the m (2≤m≤n) CPU cores included in the target CPU set among the n CPU cores is located in the critical section or the non-critical section:

locking state information of the m CPU cores included in the target CPU set; and determining whether the first CPU core is located in the critical section or the non-critical section, wherein:

the determining of whether the one or more of the m (2≤m≤n) CPU cores included in the target CPU set among the n CPU cores is located in the critical section or the non-critical section is performed in response to the determination that the first CPU core is located in the critical section, and in response to the determination that all of the (m−1) CPU cores are located in the critical section, the first CPU core is prevented from entering the interrupt-disabled section or the kernel non-preemptible section, and the determining of whether the one or more of the m (2≤m≤n) CPU cores included in the target CPU set among the n CPU cores is located in the critical section or the non-critical section is repeated.

19. The method of claim 16, further comprising:

locking state information of the m CPU cores included in the target CPU set;

determining whether the first CPU core is located in the critical section or the non-critical section, wherein the determining of whether the one or more of the m (2≤m≤n) CPU cores included in the target CPU set among the n CPU cores is located in the critical section or the non-critical section comprises determining whether the one or more of the m (2≤m≤n) CPU cores included in the target CPU set among the n CPU cores is located in the critical section or the non-critical section in response to the determination that the first CPU core is located in the critical section; and unlocking the state information of the m CPU cores to allow the first CPU core to enter the interrupt-disabled section or the kernel non-preemptible section in response to the determination that at least one of the (m−1) CPU cores is located in the non-critical section.

* * * * *